(12) United States Patent
Chang et al.

(10) Patent No.: US 8,379,379 B2
(45) Date of Patent: Feb. 19, 2013

(54) FIXING MECHANISM AND ELECTRONIC DEVICE HAVING THE SAME

(75) Inventors: Chun Chang, Taipei Hsien (TW); Yu-Tung Tsao, Taipei Hsien (TW)

(73) Assignee: Aopen Inc., Hsichih, Taipei Hsien (TW)

( * ) Notice: Subject to any disclaimer, the term of this patent is extended or adjusted under 35 U.S.C. 154(b) by 329 days.

(21) Appl. No.: 12/939,344

(22) Filed: Nov. 4, 2010

(65) Prior Publication Data

US 2011/0242752 A1    Oct. 6, 2011

(30) Foreign Application Priority Data

Mar. 31, 2010   (TW) .............................. 99205652 U

(51) Int. Cl.
*G06F 1/16* (2006.01)

(52) U.S. Cl. ................ 361/679.31; 360/96.61; 206/339; 174/116; 312/334.11

(58) Field of Classification Search .................... 360/90, 360/92.1, 93, 96.4, 96.61; 312/223.2, 902, 312/330.1, 333, 334.11, 265, 109, 111; 206/320, 206/485, 589, 319, 373, 372, 339; 174/50, 174/59, 113 R, 113 C, 116; 361/679.31, 361/679.34, 679.27, 679.09, 679.39, 679.35, 361/679.26, 679.55, 679.04, 679.56, 679.58, 361/679.02, 679.21
See application file for complete search history.

(56) References Cited

U.S. PATENT DOCUMENTS

2008/0259554 A1*  10/2008  Qin et al. ...................... 361/685
2009/0101781 A1*   4/2009  Peng et al. .................. 248/316.1

FOREIGN PATENT DOCUMENTS

TW          097201897 U       1/2006

* cited by examiner

*Primary Examiner* — Hung Duong
(74) *Attorney, Agent, or Firm* — Pillsbury Winthrop Shaw Pittman, LLP

(57) ABSTRACT

A fixing mechanism includes a positioning frame for mounting a data access device thereto and including two opposite sidewalls each having two spaced-apart through holes, a plurality of shockproof elements each extending through and being retained in a respective through hole and including a passage, and two positioning rods for positioning the data access device therebetween. The passages of the shockproof elements are adapted to correspond in position with the positioning holes. Each positioning rod includes a main body portion, and two insert portions formed respectively at two opposite ends of the main body portion. Each insert portion extends through the passage of one of the shockproof elements, and is adapted to extend into a respective positioning hole. The shockproof elements are adapted to abut against the data access device when the data access device is positioned between the positioning rods.

10 Claims, 9 Drawing Sheets

FIXING MECHANISM AND ELECTRONIC DEVICE HAVING THE SAME

CROSS-REFERENCE TO RELATED APPLICATION

This application claims priority of Taiwanese Application No. 099205652, filed on Mar. 31, 2010.

BACKGROUND OF THE INVENTION

1. Field of the Invention

This invention relates to a fixing mechanism and an electronic device having the same, more particularly to a fixing mechanism that can be quickly assembled and disassembled without using screws and an electronic device having the same.

2. Description of the Related Art

Referring to FIG. 1, an access device module 10, as disclosed in Taiwanese Patent No. M343738, comprises a receiving frame 11, and a hard disk data access device 12 disposed in the receiving frame 11. The hard disk data access device 12 includes four mounting holes 111 corresponding in position with screw holes 121 in the receiving frame 11 for mounting of shockproof elements 13 thereto, respectively. By using a plurality of screws 14 that extend through axial holes 131 in the respective shockproof elements 13 and that engage threadedly the respective screw holes 121, the data access device 12 can be secured to the receiving frame 11.

However, during assembly, a worker must use a tool (for example, a screwdriver) to successively fasten each screw 14 to the respective screw hole 121 in the data access device 12 in order to secure the data access device 12 to the receiving frame 11, so that assembly of the same is inconvenient and slow. Further, four screws 14 must be used to secure stably the data access device 12 to the receiving frame 11, resulting in an increase in production costs. Hence, the area of improvement that the present invention focuses on is that related to a structural design that can be quickly and easily assembled and disassembled without using screws.

SUMMARY OF THE INVENTION

Therefore, a main object of the present invention is to provide a fixing mechanism that can quickly and easily assemble or disassemble a data access device without using screws, that can simultaneously provide a shockproof function to the data access device, and that can minimize production costs.

Another object of the present invention is to provide an electronic device having a fixing mechanism which can quickly and easily assemble or disassemble a data access device without using screws, that can simultaneously provide a shockproof function to the data access device, and that can minimize production costs.

The purpose of the present invention and the solution to the conventional technical problems are achieved through employment of the below technical means. According to one aspect of disclosure of the present invention, a fixing mechanism is provided for installation of a data access device. The data access device has two opposite sides provided respectively with a plurality of positioning holes. The fixing mechanism comprises a positioning frame, a plurality of shockproof elements, and two positioning rods. The positioning frame is adapted to mount the data access device thereto, and includes two opposite sidewalls. Each sidewall has two spaced-apart through holes. The shockproof elements extend through and are retained respectively in the through holes. Each shockproof element includes a passage that is adapted to correspond in position with a respective one of the positioning holes. The positioning rods are provided for positioning the data access device therebetween. Each positioning rod includes a main body portion, and two insert portions formed respectively at two opposite ends of the main body portion. Each insert portion extends through the passage of one of the shockproof elements, and is adapted to extend into a respective one of the positioning holes. The shockproof elements are adapted to abut against the data access device when the data access device is positioned between the positioning rods.

According to another aspect of disclosure of the present invention, an electronic device comprises a data access device and a fixing mechanism. The data access device has two opposite sides provided respectively with a plurality of positioning holes. The fixing mechanism includes a positioning frame, a plurality of shockproof elements, and two positioning rods. The positioning frame is provided for receiving the data access device therein, and includes two opposite sidewalls. Each sidewall has two spaced-apart through holes. The shockproof elements extend through and are retained respectively in the through holes. Each shockproof element includes a passage that corresponds in position with a respective one of the positioning holes. The positioning rods are provided for positioning the data access device therebetween. Each positioning rod includes a main body portion, and two insert portions formed respectively at two opposite ends of the main body portion. Each insert portion extends through the passage of one of the shockproof elements, and extends into a respective one of the positioning holes. The shockproof elements abut against the data access device when the data access device is positioned between the positioning rods.

Through the aforesaid technical means, the advantages and effectiveness of the fixing mechanism according to the present invention reside in the fact that through the configuration of the shockproof elements and the positioning rods, a worker can quickly and easily assemble or disassemble the data access device to or from the positioning frame without using screws. Hence, assembly or disassembly time can be effectively reduced, and use of screws can be dispensed herewith, thereby minimizing production costs. Further, because the shockproof elements can absorb vibrations, the housing is prevented from producing resonance, and the effect of external vibrations on the data access device is reduced.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

The above-mentioned and other technical contents, features, and effects of this invention will be clearly presented from the following detailed description of a preferred embodiment in coordination with the reference drawings. Through description of the concrete implementation method, the technical means employed and the effectiveness to achieve the predetermined purposes of the present invention will be thoroughly and concretely understood. However, the enclosed drawings are used for reference and description only, and are not used for limiting the present invention.

Figure 1:
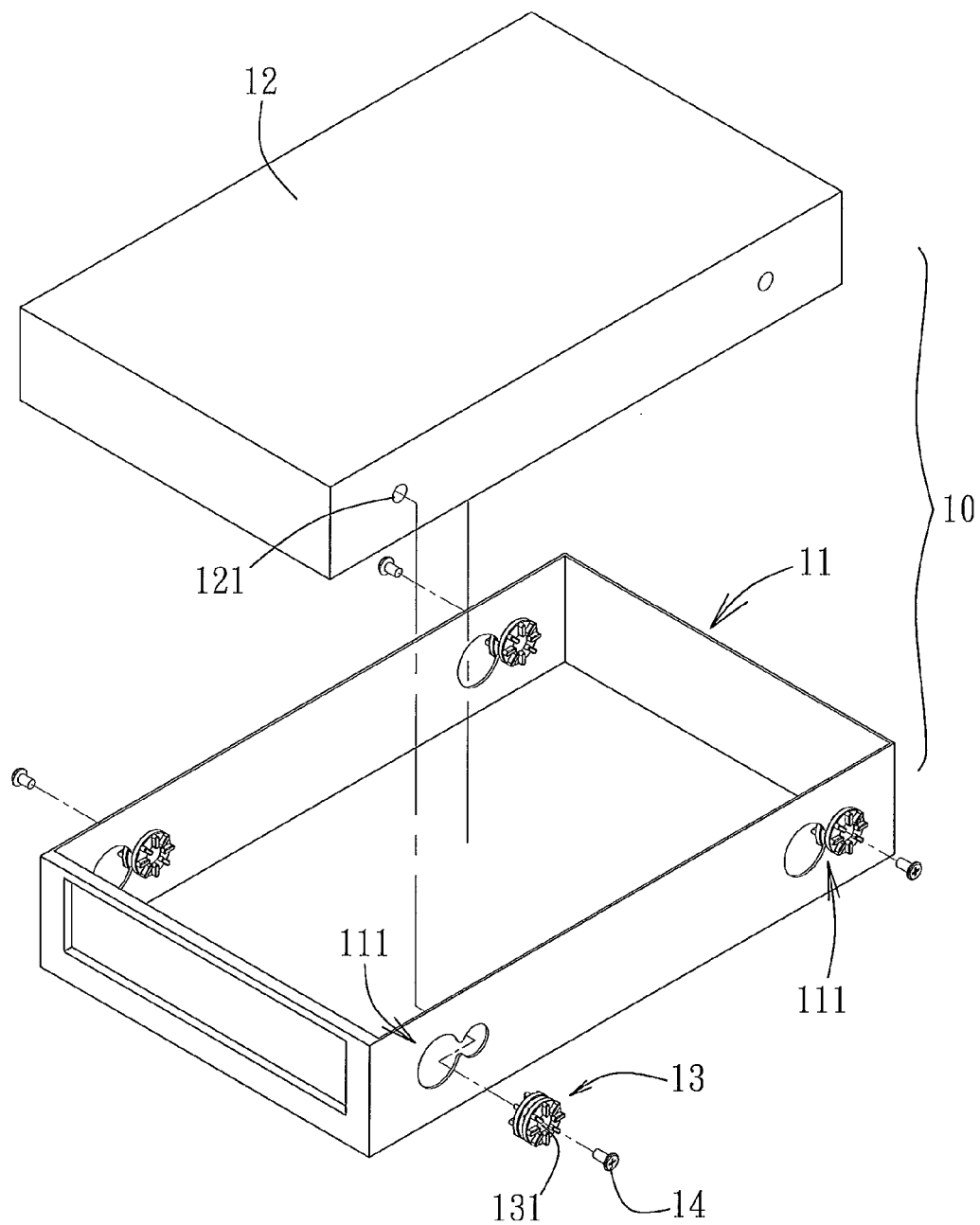
FIG. 1 is an exploded perspective view of an access device module disclosed in Taiwanese Patent No. M343738.
Figure 2:
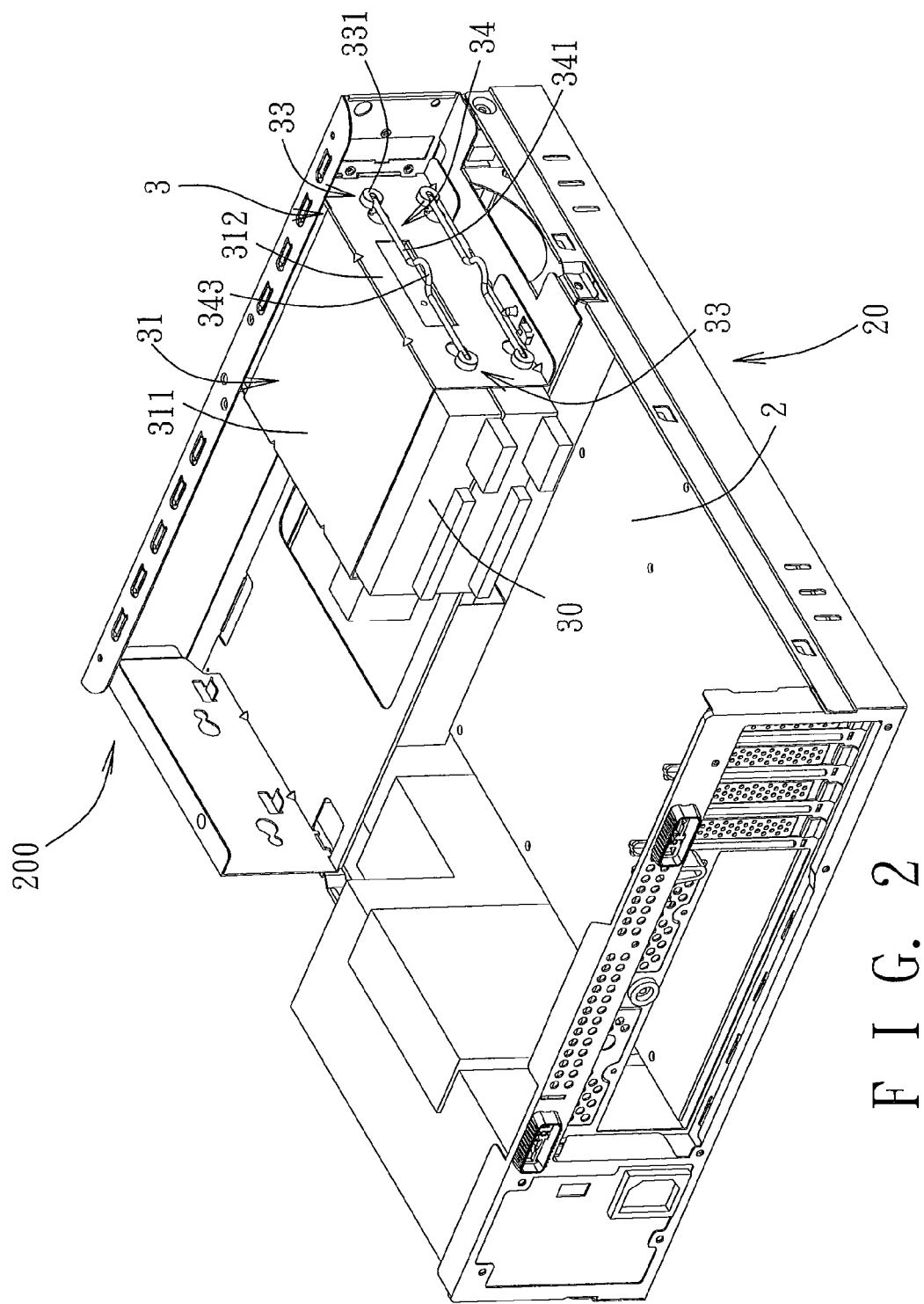
FIG. 2 is a perspective view of an electronic device having a fixing mechanism according to the preferred embodiment of the present invention.
Figure 3:
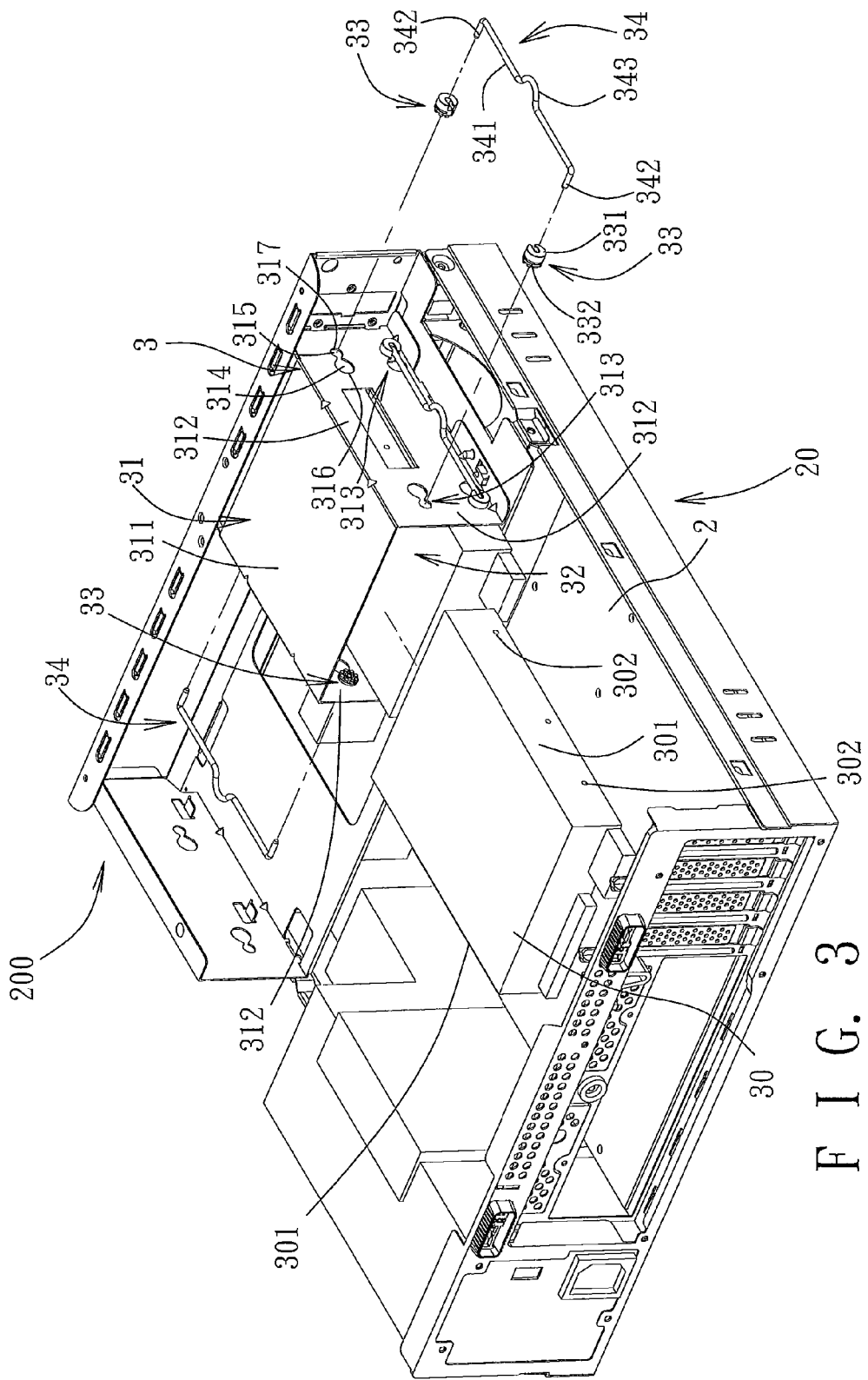
FIG. 3 is a view similar to FIG. 2, but illustrating a data access device being removed from a receiving space.

Referring to FIGS. 2 and 3, an electronic device 200 according to the preferred embodiment of the present invention comprises a housing 20 and a data access device 30. In this embodiment, the data access device 30 is exemplified as a hard disk drive. Alternatively, the data access device 30 may also be an optical disk drive.

Figure 4:
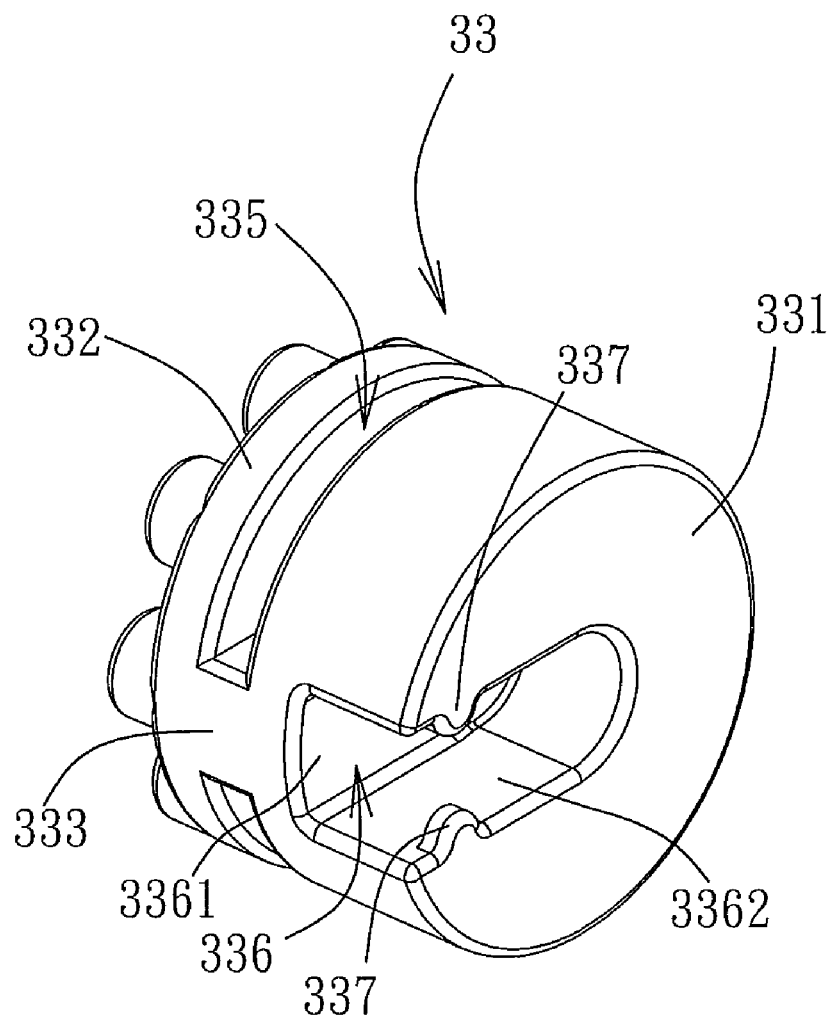
FIG. 4 is an enlarged perspective view of a shockproof element of the preferred embodiment.

With reference to FIGS. 3 and 4, the housing 3 includes a housing body 2, and a fixing mechanism 3 provided on the housing body 2 for installation of the data access devices 30. The fixing mechanism 3 includes an inverted U-shaped positioning frame 31. The positioning frame 31 includes a top wall 311, and two sidewalls 312 extending downwardly and respectively from left and right sides of the top wall 311. Each sidewall 312 can be connected to the housing body 2 by using any suitable connecting process so as to fix the positioning frame 31 to the housing body 2. The positioning frame 31 and the housing body 2 cooperatively define a receiving space 32 having an opening that opens rearwardly. The data access device 30 is inserted into the receiving space 32 via said opening. The receiving space 32 may be configured to receive two data access devices 30, as shown in FIGS. 2 and 3.

The data access device 30 includes two opposite lateral faces 301, and a plurality of positioning holes 302 formed respectively in the lateral faces 301 (only the positioning holes 302 in one of the lateral faces 301 are visible in FIG. 3). Each sidewall 312 of the positioning frame 31 is formed with two through holes 313 spaced apart from each other in a front-rear direction. Each through hole 313 has a first mounting hole portion 314, and a second mounting hole portion 315 communicating spatially with the first mounting hole portion 314. The first mounting hole portion 314 has a diameter larger than that of the second mounting hole portion 315, and has a substantially C-shaped first inner periphery 316. The second mounting hole portion 315 has a substantially C-shaped second inner periphery 317 connected to the C-shaped first inner periphery 316 such that the C-shaped first and second inner peripheries 316, 317 face each other. The second mounting hole portions 315 of the through holes 313 in each sidewall 312 are distal from each other. The second mounting hole portion 315 of each through hole 313 corresponds in position with each positioning hole 302 in the data access device 30.

Figure 5:
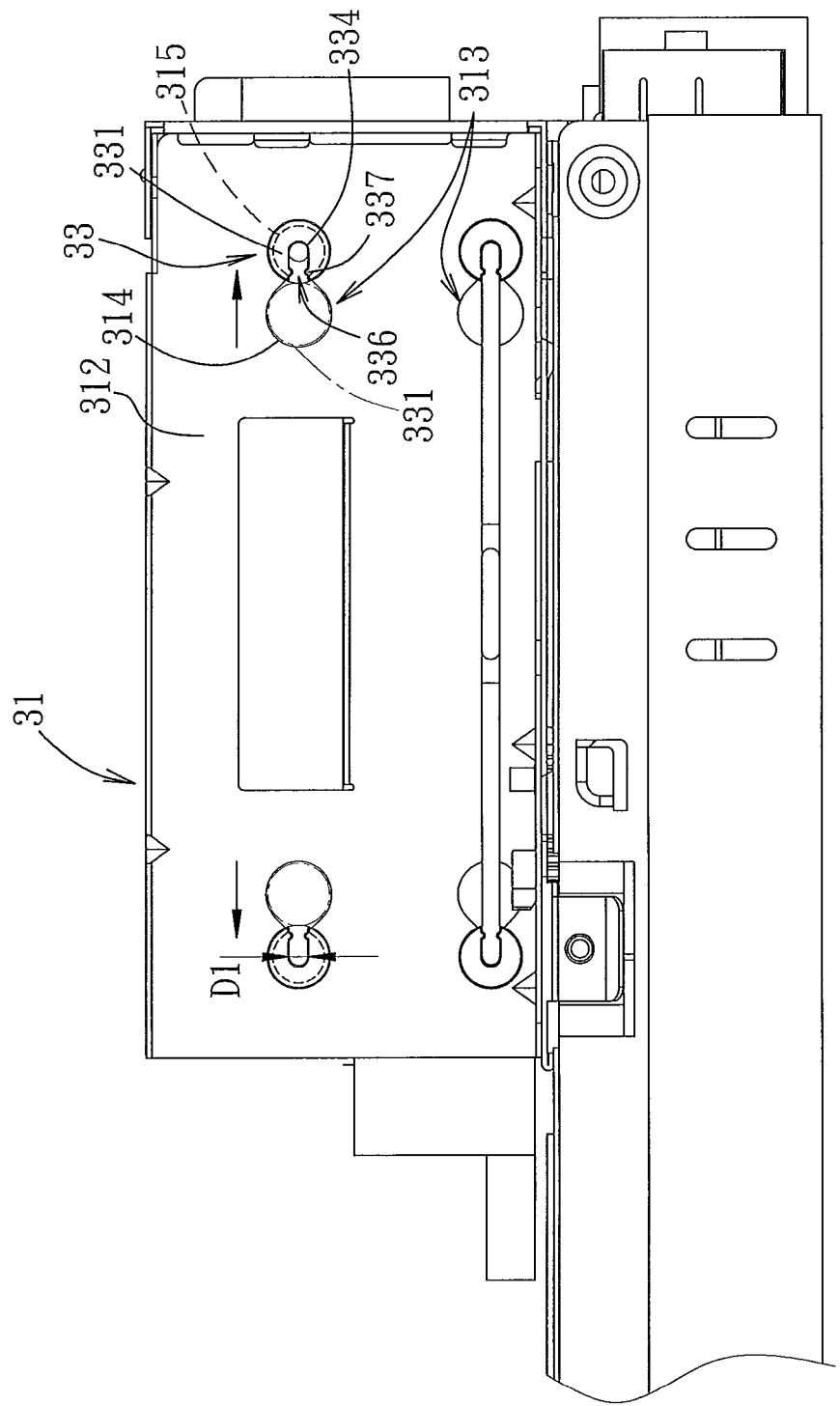
FIG. 5 is a fragmentary schematic side view of the preferred embodiment, illustrating the shockproof element disposed in a second mounting hole portion of a through hole in a positioning frame.
Figure 6:
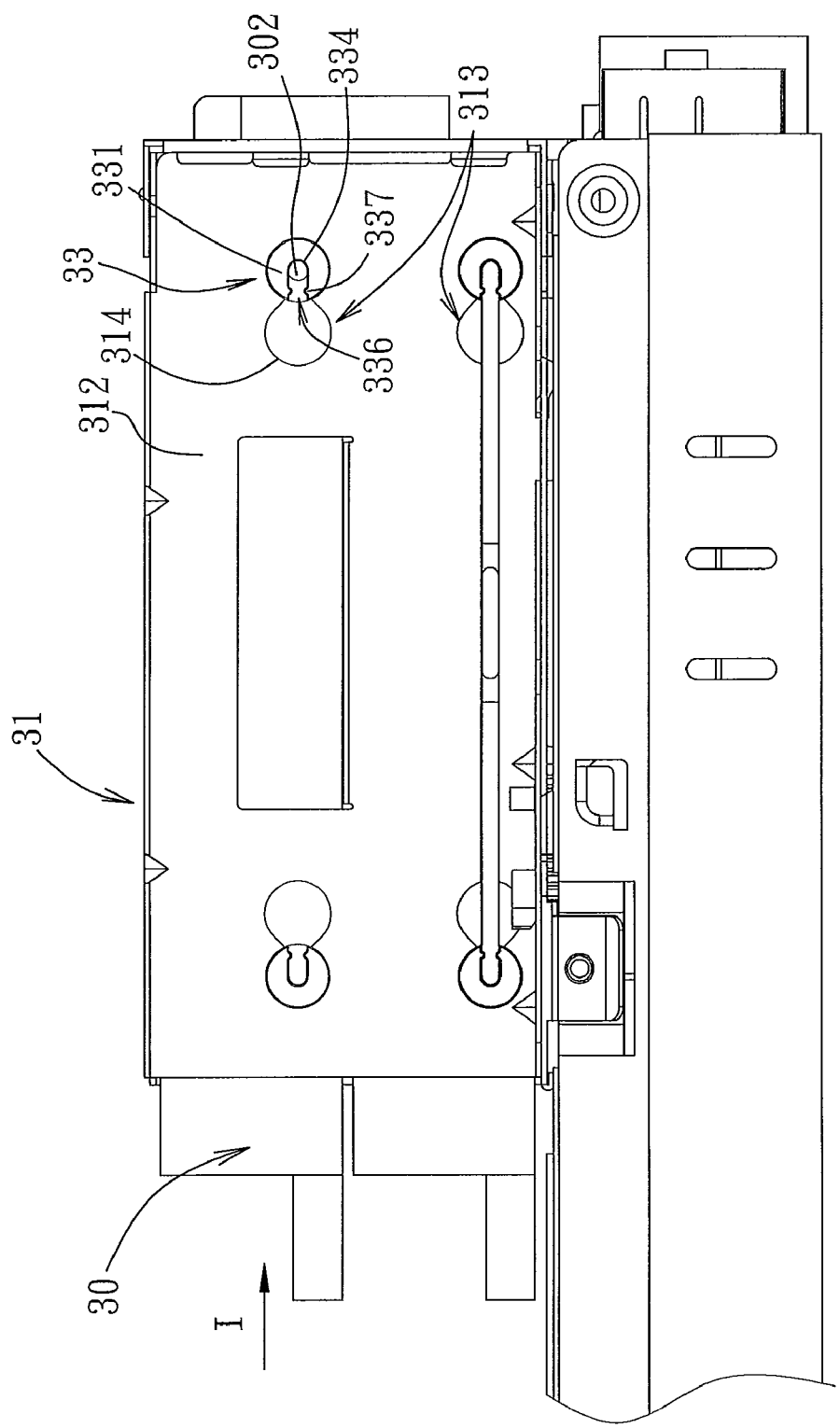
FIG. 6 is a view similar to FIG. 5, but illustrating a positioning hole in the data access device aligned with a passage in the shockproof element.
Figure 7:
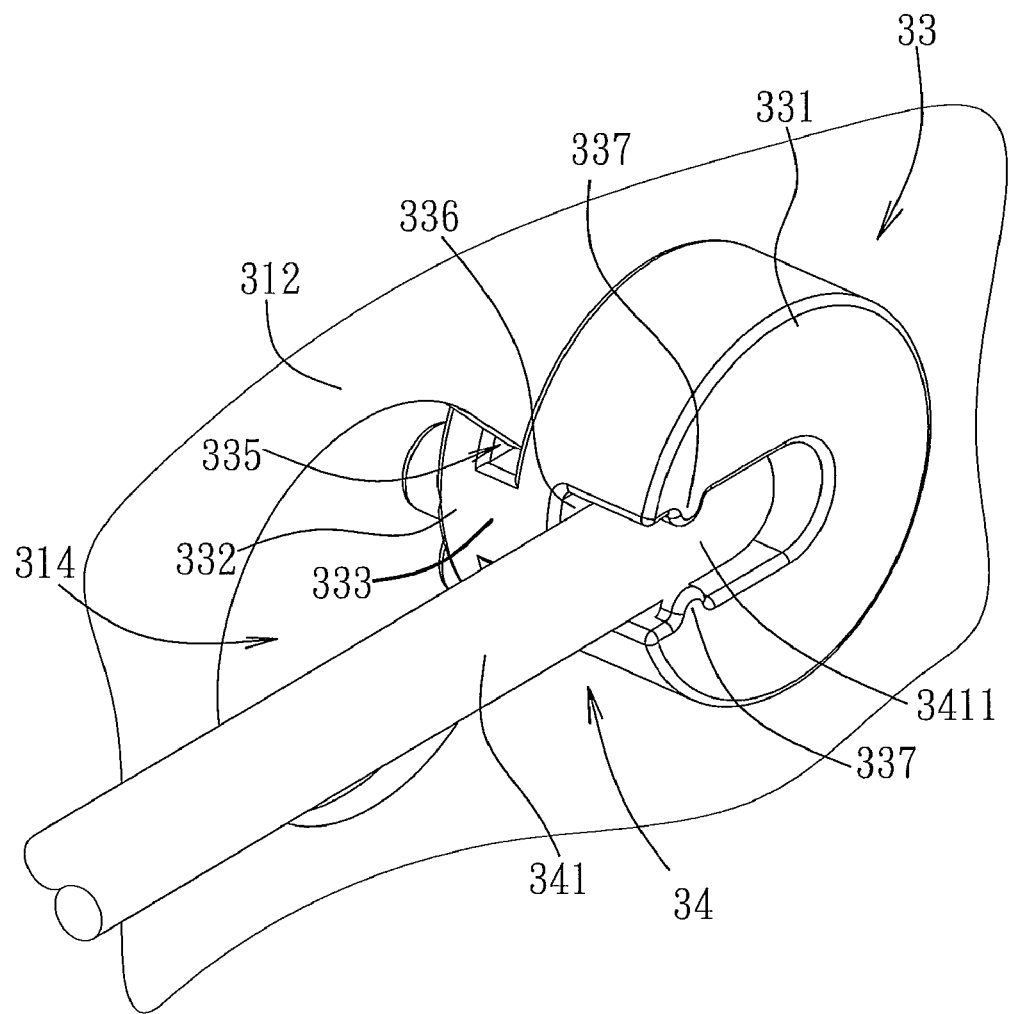
FIG. 7 is a fragmentary enlarged perspective view of the preferred embodiment, illustrating how a positioning rod is prevented by stop protrusions from moving out of a cutout in the shockproof element.

The fixing mechanism 3 further includes four shockproof elements 33 each made of an elastic material, such as rubber or silicone. Each shockproof element 33, as shown in FIG. 4, includes a first cushion pad 331, a second cushion pad 332 opposite to the first cushion pad 331, a connecting portion 333 interconnecting the first and second cushion pads 331, 332, and a passage 334 (see FIGS. 5, 6, and 8) extending through the first and second cushion pads 331, 332 and the connecting portion 333. Each of the first and second cushion pads 331, 332 has a circular configuration with an outer diameter smaller than that of the first mounting hole portion 314, but larger than that of the second mounting hole portion 315.

The fixing mechanism 3 further includes two positioning rods 34. Each positioning rod 34 is substantially U-shaped, and includes a main body portion 341, and two insert portions 342 formed respectively on two opposite ends of the main body portion 341. Each insert portion 342 is formed by bending a respective end of the main body portion 341. The insert portions 342 of each positioning rod 34 are inserted into the positioning holes 302 in a respective lateral face 301 of the data access device 30 via the passages 334 in the respective shockproof elements 33. Through such a connection, the data access device 30 can be positioned between the two positioning rods 34 and fixed within the receiving space 32 in the positioning frame 31.

With reference to FIGS. 5 to 8, to mount fixedly the data access device 30 within the receiving space 32 in the positioning frame 31, the second cushion pad 332 of each shockproof element 33 is first inserted through the first mounting hole portion 314 of the respective through hole 313 so that the first and second cushion pads 331, 332 of each shockproof element 33 are disposed respectively on outer and inner sides of each sidewall 312, and the connecting portion 333 of each shockproof element 33 faces the second mounting hole portion 315 of the respective through hole 313. Each shockproof element 33 is then moved into the second mounting hole portion 315 of the respective through hole 313, so that the junction of the first and second inner peripheries 316, 317 passes through a C-shaped groove 335 (see FIG. 4), which is between the first and second cushion pads 331, 332 of each shockproof element 33, and abuts against the connecting portion 333 of the respective shockproof element 33. At this time, each shockproof element 33 is positioned in the second mounting hole portion 315 of the respective through hole 313.

Subsequently, the data access device 30 is inserted into the receiving space 32 in the positioning frame 31 along the direction of an arrow (I) (see FIG. 6) such that the positioning holes 302 in the lateral faces 301 of the data access device 30 are aligned with the passages 334 in the respective shockproof elements 33. The insert portions 342 of the positioning rods 34 are then inserted through the passages 334 in the respective shockproof elements 33 and into the positioning holes 302 in the lateral faces 301 of the data access device 30 along the direction of an arrow (II) (see FIG. 8). Since the passage 334 of each shockproof element 33 has a hole diameter (D1) (see FIG. 5) smaller than an outer diameter (D2) (see FIG. 8) of each insert portion 342 of the positioning rod 34, when each insert portion 342 is inserted into the respective passage 334, each insert portion 342 is press-fitted into the respective passage 334, so that each shockproof element 33 can clamp stably each insert portion 342 of the positioning rod 34. Through such a connection, the data access device 30 is unaffected by vibrations produced during its operation or when an external force is applied to the housing 20, so that separation of each insert portion 342 of the positioning rod 34 from the respective positioning hole 302 and the passage 334 in the respective shockproof element 33 can be prevented.

Preferably, in this embodiment, to ensure that the insert portions 342 of each positioning rod 34 cannot be detached from the respective positioning holes 302 and the passages 334 in the respective shockproof elements 33 when the housing 20 drops during transport or use thereof, aside from the tight-fitting configuration of each insert portion 342 with the respective passage 334, the clamping force of each shockproof element 33 must achieve a definite degree. Based on the clamping force value, the outer diameter (D2) of each insert portion 342, and the material of each shockproof element 33, the size of the hole diameter (D1) of the passage 334 of each shockproof element 33 can be calculated through the following formula:

$$D1=D2-2F/K$$

where F is the clamping force of the shockproof element 33 for clamping each insert portion 342 of the positioning rod 34, D2 is the outer diameter of each insert portion 342, and K is the coefficient of elasticity of the shockproof element 33.

The value of F is calculated by multiplying the weight of the positioning rod 34 with gravity plus the acceleration. The value of D2 is usually smaller than the diameter of the positioning hole 302. Through the aforesaid formula, the hole diameter (D1) of the passage 334 of the shockproof element 33 can be calculated, so that each shockproof element 33 can stably clamp the respective insert portion 342 of the positioning rod 34 to thereby ensure that the positioning rod 34 will not be separated therefrom.

Furthermore, each shockproof element 33 further includes a cutout 336 (see FIG. 4) formed in the first cushion pad 331 and communicating spatially with the passage 334, and two stop protrusions 337 (see FIG. 4) projecting toward each other from a wall that defines the cutout 336 and located in proximity to an outer face of the first cushion pad 331. The cutout 336 has a first opening 3361 extending through an outer peripheral face of the first cushion pad 331, and a second opening 3362 extending through the outer face of the first cushion pad 331. The first openings of the cutouts 336 of two adjacent ones of the shockproof elements 33 face each other. Thus, during assembly of each positioning rod 34, a section 3411 of the main body portion 341 that is adjacent to a respective insert portion 342 of the positioning rod 34 is squeezed through the stop protrusions 337 of the respective shockproof element 33 so as to deform the same. After the section 3411 of the main body portion 341 passes through the stop protrusions 337 and is received in the cutout 336, the stop protrusions 337 restore to their original positions, and abut against the section 3411 of the main body portion 341 to retain the same within the cutout 336. Through such a connection, when the housing 20 drops during transport or use thereof, the insert portions 342 of the positioning rod 34 can remain stably connected to the respective positioning holes 302 and the passages 334 in the respective shockproof elements 33. Alternatively, the number of the stop protrusion 337 may be one, and the effect of preventing the section 3411 of the main body portion 341 from slipping out of the cutout 336 can be similarly achieved.

Since the insert portions 342 of the positioning rods 34 are inserted into the respective positioning holes 302 in the lateral faces 301 of the data access device 30 so that the data access device 30 is positioned between the two positioning rods 34, and since the lateral faces 301 of the data access device 30 abut against the second cushion pads 332 of the shockproof elements 33, the data access device 30 and the two positioning rods 34 are formed into a rigid structure. Vibrations produced during operation of the data access device 30 can be transmitted to the shockproof elements 33, so that the shockproof elements 33 can absorb the vibrations and prevent the housing 20 (see FIG. 2) from producing resonance. This can effectively resolve the problem of the unstable condition of the housing 20 caused by vibrations produced during operation of the data access device 30, and can resolve the problem of noise produced by vibrations. Further, when an external force is applied to the housing 20 so that the housing 20 vibrates, the shockproof elements 33 can similarly absorb the vibrations produced by the positioning frame 31 of the housing 20, thereby minimizing the effect of external vibrations on the data access device 30. Hence, stability of the data access device 30 during operation thereof can be enhanced.

Figure 8:
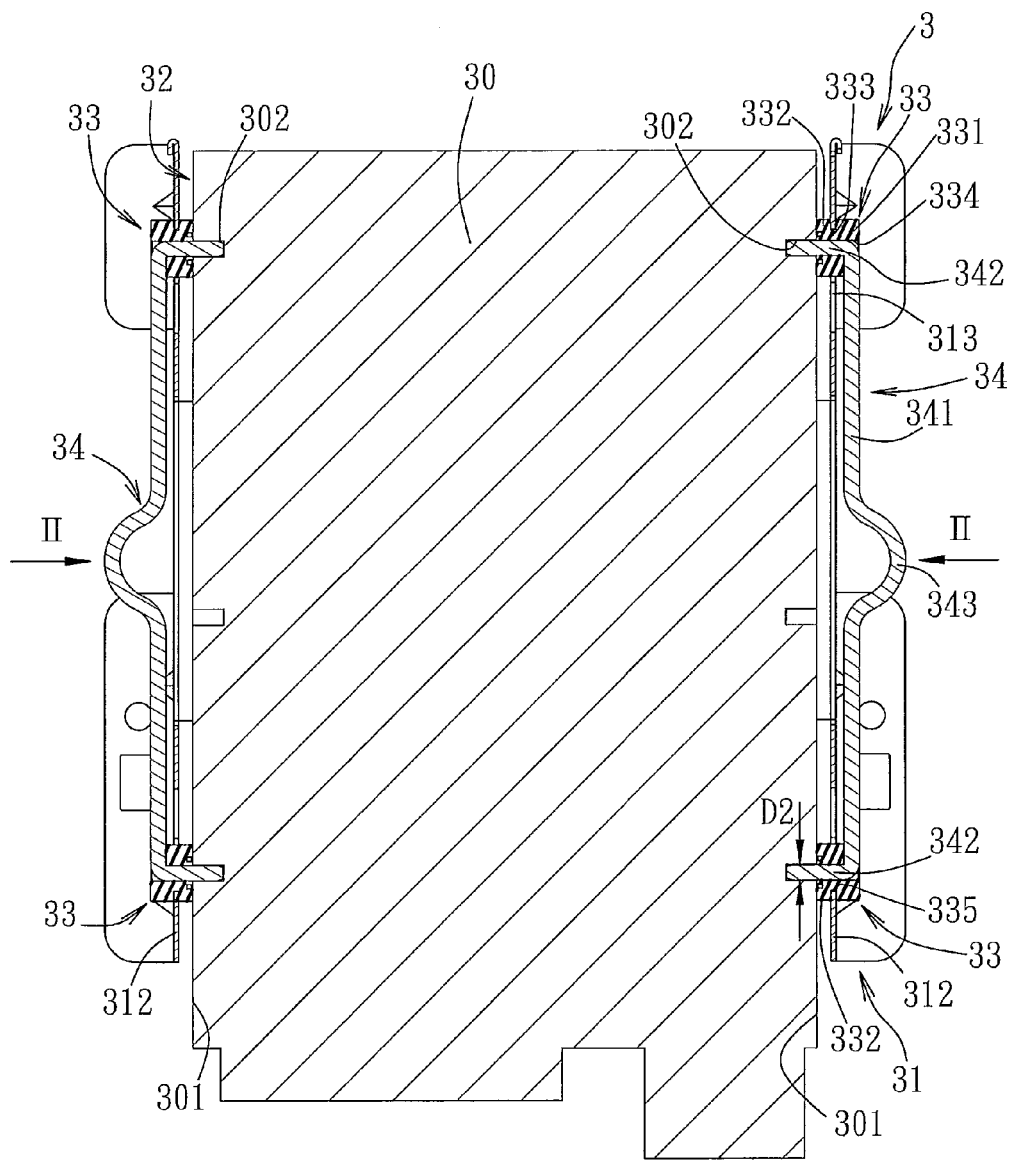
FIG. 8 is a sectional view of the preferred embodiment, illustrating insert portions of each positioning rod extending respectively through the passages in the shockproof elements into the respective positioning holes in the data access device.
Figure 9:
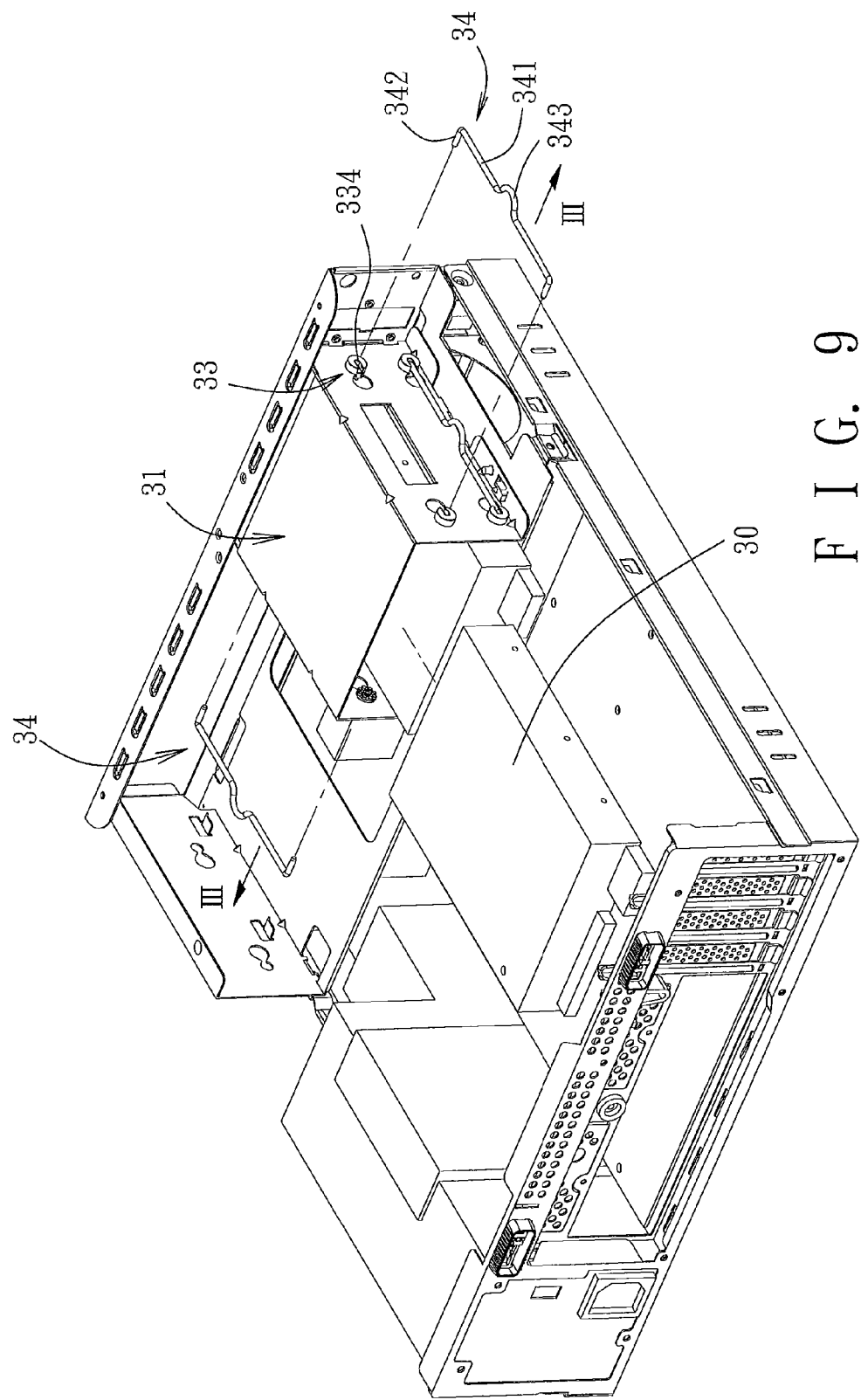
FIG. 9 is a perspective view of the preferred embodiment, illustrating the positioning rods being pulled out from the positioning frame.

With reference to FIGS. 8 and 9, since the main body portion 341 of each positioning rod 34 has a curved section 343 between the insert portions 342, if the data access device 30 is to be removed from the positioning frame 31, the user can use his/her finger to hook onto the curved section 343 of the main body portion 341 of each positioning rod 34 and pull outwardly the positioning rod 34 along the direction of an arrow (III), thereby separating the insert portions 342 of the positioning rod 34 from the respective positioning holes 302 and the respective passages 334. At this time, the data access device 30 can be pulled out from the receiving space 32 in the positioning frame 31.

From the aforesaid description, through the configuration of the shockproof elements 33 and the positioning rods 34 of the fixing mechanism 3, the data access device 30 of the present invention can be quickly and easily assembled on or disassembled from the positioning frame 31 without using screws. As a result, time for assembly or disassembly can be effectively reduced, and use of screws can be eliminated to thereby reduce production costs. Further, through the shockproof elements 33 that absorb vibrations, the housing 20 can be prevented from producing resonance and the effect of external vibrations on the data access device 30 can be minimized. Therefore, the objects of the present invention can be realized.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A fixing mechanism for installation of a data access device, the data access device having two opposite sides provided respectively with a plurality of positioning holes, said fixing mechanism comprising:
   a positioning frame adapted to mount the data access device thereto and including two opposite sidewalls, each of said sidewalls having two spaced-apart through holes;
   a plurality of shockproof elements extending through and being retained respectively in said through holes, each of said shockproof elements including a passage that is adapted to correspond in position with a respective one of the positioning holes; and
   two positioning rods for positioning the data access device therebetween, each of said positioning rods including a main body portion, and two insert portions formed respectively at two opposite ends of said main body portion, each of said insert portions extending through said passage of one of said shockproof elements and being adapted to extend into a respective one of the positioning holes, whereby said shockproof elements are adapted to abut against the data access device when the data access device is positioned between said positioning rods.

2. The fixing mechanism of claim 1, wherein said passage of each of said shockproof elements has a hole diameter smaller than an outer diameter of each of said insert portions.

3. The fixing mechanism of claim 2, wherein each of said shockproof elements further includes a cutout communicating spatially with said passage and receiving therein a section of said main body portion that is adjacent to a respective one of said insert portions, and a stop protrusion projecting inwardly from a wall that defines said cutout to prevent removal of said section of said main body portion from said cutout.

4. The fixing mechanism of claim 3, wherein said main body portion of each of said positioning rods has a curved section between said insert portions.

5. The fixing mechanism of claim 1, wherein each of said shockproof elements further includes a cutout communicating spatially with said passage and receiving therein a section of said main body portion that is adjacent to a respective one of said insert portions, and a stop protrusion projecting inwardly from a wall that defines said cutout to prevent removal of said section of said main body portion from said cutout.

6. An electronic device comprising:
a data access device having two opposite sides provided respectively with a plurality of positioning holes; and
a fixing mechanism including
a positioning frame for receiving said data access device therein and including two opposite sidewalls, each of said sidewalls having two spaced-apart through holes,
a plurality of shockproof elements extending through and being retained respectively in said through holes, each of said shockproof elements including a passage that corresponds in position with a respective one of said positioning holes, and
two positioning rods for positioning said data access device therebetween, each of said positioning rods including a main body portion, and two insert portions formed respectively at two opposite ends of said main body portion, each of said insert portions extending through said passage of one of said shockproof elements and extending into a respective one of said positioning holes, whereby said shockproof elements abut against said data access device when said data access device is positioned between said positioning rods.

7. The electronic device of claim 6, wherein said passage of each of said shockproof elements has a hole diameter smaller than an outer diameter of each of said insert portions.

8. The electronic device of claim 7, wherein each of said shockproof elements further includes a cutout communicating spatially with said passage and receiving therein a section of said main body portion that is adjacent to a respective one of said insert portions, and a stop protrusion projecting inwardly from a wall that defines said cutout to prevent removal of said section of said main body portion from said cutout.

9. The electronic device of claim 8, wherein said main body portion of each of said positioning rods has a curved section between said insert portions.

10. The electronic device of claim 6, wherein each of said shockproof elements further includes a cutout communicating spatially with said passage and receiving therein a section of said main body portion that is adjacent to a respective one of said insert portions, and a stop protrusion projecting inwardly from a wall that defines said cutout to prevent removal of said section of said main body portion from said cutout.

* * * * *